(No Model.)
F. H. HARRIS.
WHEEL.
No. 353,060. Patented Nov. 23, 1886.
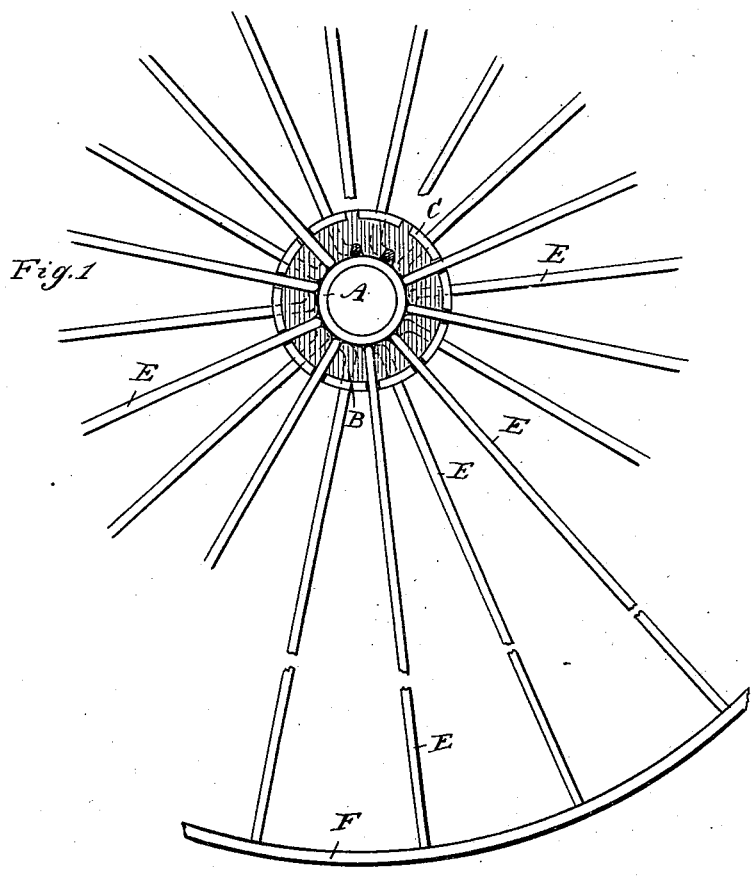
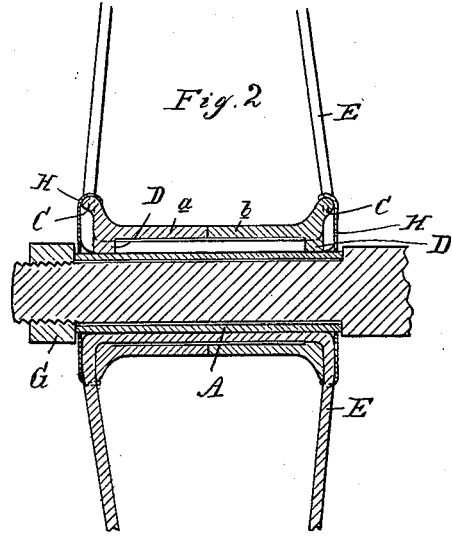
Attest:
John Schuman.
E. Scully.
Inventor:
Frank H. Harris.
by his Att'y

UNITED STATES PATENT OFFICE.

FRANK H. HARRIS, OF TOLEDO, OHIO.

WHEEL.

SPECIFICATION forming part of Letters Patent No. 353,060, dated November 23, 1886.

Application filed April 8, 1886. Serial No. 198,222. (No model.)

*To all whom it may concern:*

Be it known that I, FRANK H. HARRIS, of Toledo, in the county of Lucas and State of Ohio, have invented new and useful Improvements in Wheels; and I do hereby declare that the following is a full, clear, and exact description thereof, reference being had to the accompanying drawings, which form a part of this specification.

This invention relates to certain new and useful improvements in wheels; and the invention consists in the peculiar construction of, and means employed for, securing the spokes in the hub, all as more fully hereinafter set forth.

Figure 1 is an elevation of my improved wheel. Fig. 2 is a central vertical section in the longitudinal direction of the hub.

In the accompanying drawings, which form a part of this specification, A represents the thimble or bearing, through which the axle-arm passes, such thimble consisting of a plane tube.

B represents the hub, which is preferably cast in two parts, $a\ b$, each being provided upon the outer end with an outwardly-projecting notched flange, C, and upon the inside with the inwardly-projecting studs or lugs, D, within which the thimble A closely fits. These lugs D are not directly opposite each other, but are so formed that the opening formed by them between the hub and the thimble in the longitudinal direction of the hub will be in a diagonal line.

E are the spokes, two of which are formed from a single piece of rod, which is inserted through the openings between the lugs D, and then bent outwardly and at an angle, their outer ends being rigidly secured in the rim F in any convenient manner.

By this construction it will be seen that should one of the spokes be accidentally broken it can readily be bent down and withdrawn from the hub and a new one inserted without being compelled to disturb the other parts of the wheel.

While I have shown the lugs D as forming an integral part with the hub sections, I do not desire to confine myself to such construction, as such lugs may be formed upon the outer face of the thimble with equally as good result.

When the wheel is in place upon the axle or arm, it is retained by a nut, G, as in the ordinary manner. To present a more finished appearance to the wheel, I employ a cap, H, preferably struck up out of sheet metal, the flange of such cap being notched, so that when in place it may be sprung over the ends of the hub and embrace the spokes, as shown in Fig. 2.

I do not claim, broadly, a wheel each pair of spokes of which is formed of a single rod, for I am aware that such is not new with me.

What I claim as my invention is—

1. A wheel consisting of a thimble inclosed within a hub, openings between such thimble and hub diagonally opposite each other in the longitudinal direction of the axle, and spokes passing through such openings with their outer ends secured to a rim, substantially as described.

2. In a wheel of the character described, a hub provided with outwardly-projecting notched flange, C, and inwardly-projecting lugs, D, substantially as and for the purposes specified.

3. The combination, with the hub B, provided with notched flange C and lugs D, diagonally opposite each other in the longitudinal direction of the hub of the spokes, each pair formed of a single rod, and inserted in the openings between said lugs, substantially as described.

FRANK H. HARRIS.

Witnesses:
W. H. A. READ,
W. J. DANIELS.